United States Patent [19]

Newton et al.

[11] Patent Number: 5,933,765

[45] Date of Patent: Aug. 3, 1999

[54] COMMUNICATION DEVICE HAVING A REDUCED LEVEL OF HAZARDOUS SUBSTANCES

[75] Inventors: Mark D. Newton, Sunrise; Steven D. Pratt; Sivakumar Muthuswamy, both of Plantation, all of Fla.; Kimberly A. Williams, Columbus, Ohio; Thomas J. Swirbel, Davie, Fla.; James Lynn Davis, Parkland, Fla.; Lara J. Martin, Fort Lauderdale, Fla.; Robert J. Mulligan, Plantation, Fla.; Kevin J. Pieper, Coral Springs, Fla.; Brian H. Lee, Maynooth; Roger K. Callanan, Artane, both of Ireland

[73] Assignee: Motorola, Inc., Schaumburg, Ill.

[21] Appl. No.: 08/727,330

[22] Filed: Oct. 8, 1996

[51] Int. Cl.$^6$ ....................................................... H04B 1/38
[52] U.S. Cl. ............................................. 455/90; 361/771
[58] Field of Search .............................. 455/90; 361/748, 361/760, 771; 29/829; 340/825.44

[56] References Cited

U.S. PATENT DOCUMENTS

| | | | |
|---|---|---|---|
| 4,959,510 | 9/1990 | Matsusaka et al. | 361/771 X |
| 4,970,780 | 11/1990 | Suda et al. | 29/840 |
| 5,011,256 | 4/1991 | Johnson et al. | 385/92 |
| 5,019,944 | 5/1991 | Ishii et al. | 361/783 |
| 5,565,261 | 10/1996 | Carson et al. | 340/825.44 X |

OTHER PUBLICATIONS

"A System for Calculating Environmental Impact," Federation of Swedish Industries, Swedish Environmental Research Institute, Volvo Car Corporation Version 1, May, 1991.

*Primary Examiner*—Thomas Mullen
*Attorney, Agent, or Firm*—Dale W. Dorinski

[57] ABSTRACT

A communication device is designed to contain the lowest possible level of toxic or hazardous materials, so that when it is eventually disposed of, it will not harm the environment and can be safely recycled. Each component $A_1, A_2, \ldots, A_n$ in the communication device has a calculated Component Toxicity Index value. A Product Toxicity Index for the entire communication device is calculated by summing the individual Component Toxicity Index values. The desired outcome is a communication device having a Product Toxicity Index less than or equal to 100. The resulting communication device is referred to as "environmentally friendly". The communication device may be a two-way radio (10), and some of the components are a radio transmitter (12), a radio receiver (14), an antenna (16), an amplifier (18), a battery (20) and a housing (22).

5 Claims, 1 Drawing Sheet

COMMUNICATION DEVICE HAVING A REDUCED LEVEL OF HAZARDOUS SUBSTANCES

TECHNICAL FIELD

This invention relates in general to electronic products, and in particular to communication devices having a reduced level of hazardous materials contained therein, and a method of calculating the relative toxicity level of such a device.

BACKGROUND

Historically, most organizations viewed environmental management as an obligation, driven by regulatory mandates and restrictions. Management focused on minimizing cost, managing risks, and avoiding unnecessary interference in their primary lines of business. Compliance and other environmental management actions were addressed as an afterthought, when the broad strategy and design for products had been defined and manufacturing had begun. Today, in response to the converging forces of increased competition, tougher environmental challenges, and more demanding customers, a fundamental shift is taking place. Industries ranging from cosmetics to computers to telecommunications are beginning to actively seek opportunities to gain competitive advantage through environmental excellence. Those organizations that integrate environmental factors into their business strategy and product design are finding that it can contribute to rather than hinder, their financial performance. Products are being designed with an eye toward life-cycle costs and environmental impact. For example, many governmental authorities are beginning to require that a firm take back its products at the end of the product's life cycle, and customers will soon expect this as a standard feature of all products.

In addition, strict environmental regulations regarding hazardous substances are now in place, and continue to become even more extensive. This oftentimes contradictory array of regulations and product requirements has created an even greater burden on the product designer who endeavors to create a product that will meet the expectations and requirements of both today's market and the market of the future. A need exists for a tool that a designer can use to effectively assess the environmental impact of a design, thus creating a product that can be deemed "environmentally friendly".

DETAILED DESCRIPTION OF THE PREFERRED EMBODIMENT

A communication device can be designed to contain a very low level of toxic materials, so that when it is eventually disposed of, it will not harm the environment and it can be safely recycled. The communication device is a radio having a plurality of components $A_1, A_2, \ldots, A_n$. Each component has an associated Component Toxicity Index value that is calculated by the equation:

$$\text{Component Toxicity Index of } A_n = (\text{Unit Toxicity}_{substance\ i} + \text{Unit Toxicity}_{substance\ j} \ldots) * \text{Mass of Component } A_n.$$

A Product Toxicity Index for the entire communication device is calculated by summing the Component Toxicity Index of each of the individual components $(A_1, A_2, \ldots, A_n)$ contained in the device. In the preferred embodiment, the communication device has a Product Toxicity Index less than or equal to 100. The resulting communication device is referred to as "environmentally friendly". In one embodiment of the invention, the communication device is a two-way radio, and the plurality of components comprise, among other things, a radio transmitter, a radio receiver, an antenna, an amplifier, a battery and a housing.

While the specification concludes with claims defining the features of the invention that are regarded as novel, it is believed that the invention will be better understood from a consideration of the following description in conjunction with the drawing FIGURE. The Product Toxicity Index was created to ensure that the total level of toxic substances used in communication devices are kept to a bare minimum. The index is based on hazardous substance legislation currently in effect in Europe, and in particular, it reflects the stringent standards imposed by the PTT Telecom, Netherlands, because these standards are comprehensive, conservative, and technically sensible. Table 1 lists the published limits for a number of currently restricted substances. The sources for the published limits are PTT Telecom SI-212219010 version 931229, and the United States Environmental Protection Agency RCRA 33/50, Hazardous Waste Designation Decree 617 (The Netherlands, 1993), and Chem VerbotsV (Germany, 1994). Starting from here, we created a measurement called Unit Toxicity by arbitrarily assigning a Unit Toxicity value of 1000 to the most highly regulated substances, i.e. those having a "published limit" of 50 ppm. The Unit Toxicity value is inversely proportional to the published limit i.e. substances that have a higher published limit (less toxic) will have a lower Unit Toxicity value. Table 1 lists the calculated Unit Toxicity values for each of the substances of interest. The Unit Toxicity value of any substances not listed in Table 1 can be easily calculated from the allowable limit published in the standard or regulation of interest.

TABLE 1

| Substance | Toxicity Index | Published Limit | Ref* |
|---|---|---|---|
| 1,1,1-trichloroethane (TCA) | X | 0 ppm | 1, 2, 3 |
| arsenic and arsenic compounds | X | 0 ppm | 1, 2, 3 |
| cadmium external plating and cadmium compounds | X | 0 ppm | 2, 3, 4 |
| carbon tetrachloride | X | 0 ppm | 1, 2, 3, 4 |

TABLE 1-continued

| Substance | Toxicity Index | Published Limit | Ref* |
|---|---|---|---|
| chlorofluorocarbons and halons in foamed plastic | X | 0 ppm | 3 |
| creosotes | X | 0 ppm | 3 |
| halogenated dioxins and furans | X | 0 ppm | 3 |
| mercury and mercury compounds | X | 0 ppm | 1, 2, 3, 4 |
| organo-tin compounds (metallic tin OK) | X | 0 ppm | 1, 2, 3 |
| pentachlorophenol salts and compounds | 10000 | 5 ppm | 3 |
| polychlorobiphenyls and derivatives | 10000 | 5 ppm | 1, 2, 3 |
| polychloroterphenyls and derivatives | 10000 | 5 ppm | 1, 2, 3 |
| Aldrin (HHDN) | 1000 | 50 ppm | 1, 2 |
| anthracene | 1000 | 50 ppm | 1, 2 |
| antimony and antimony compounds | 1000 | 50 ppm | 1, 2 |
| benzene | 1000 | 50 ppm | 1, 2, 3, 4 |
| benzo(a)anthracene | 1000 | 50 ppm | 1, 2 |
| benzo(a)pyrene | 1000 | 50 ppm | 1, 2 |
| benzo(ghi)perylene | 1000 | 50 ppm | 1, 2 |
| benzo(k)fluoranthene | 1000 | 50 ppm | 1, 2 |
| beryllium and beryllium compounds | 1000 | 50 ppm | 1, 2 |
| cadmium alloy | 1000 | 50 ppm | 1, 2, 4 |
| chromium (VI) compounds | 1000 | 50 ppm | 1, 2, 4 |
| chrysene | 1000 | 50 ppm | 1, 2 |
| cyanides (inorganic) | 1000 | 50 ppm | 1, 2, 4 |
| Dieldrin (insecticide 497, Hendrin) | 1000 | 50 ppm | 1, 2 |
| Endrin (insecticide 269, HEOD) | 1000 | 50 ppm | 1, 2 |
| fluoranthene | 1000 | 50 ppm | 1, 2 |
| halogenated aromatic compounds | 1000 | 50 ppm | 1, 2, 3 |
| halogenated fused aromatics | 1000 | 50 ppm | 1, 2 |
| indeno(1,2,3-cd)pyrene | 1000 | 50 ppm | 1, 2 |
| lead compounds (note: index value is 1000, not 10) | 1000 | 5,000 ppm | 1, 2, 4 |
| metal carbonyls | 1000 | 50 ppm | 1, 2 |
| naphthalene | 1000 | 50 ppm | 1, 2 |
| phenanthrene | 1000 | 50 ppm | 1, 2 |
| selenium and selenium compounds | 1000 | 50 ppm | 1, 2 |
| tellunum and tellurium compounds | 1000 | 50 ppm | 1, 2 |
| thallium and thallium compounds | 1000 | 50 ppm | 1, 2 |
| lead alloy, metal. . . (note: index value is 100, not 10) | 100 | 5,000 ppm | 1, 2, 4 |
| amines, aromatic | 50 | 1,000 ppm | 3 |
| asbestos | 50 | 1,000 ppm | 3 |
| formaldehyde | 25 | 2,000 ppm | 1, 2 |
| aluminum chloride | 10 | 5,000 ppm | 1, 2 |
| amines, aliphatic | 10 | 5,000 ppm | 1, 2 |
| bromine (elemental) | 10 | 5,000 ppm | 1, 2 |
| chlorine (elemental) | 10 | 5,000 ppm | 1, 2 |
| chlorofluorocarbons and halons | 10 | 5,000 ppm | 1, 2 |
| chloroform | 10 | 5,000 ppm | 1, 2, 4 |
| chromium(III) compounds | 10 | 5,000 ppm | 1, 2, 4 |
| cobalt compounds (elemental cobalt OK) | 10 | 5,000 ppm | 1, 2 |
| copper compounds (elemental copper OK) | 10 | 5,000 ppm | 1, 2 |
| cutting oils and emulsions | 10 | 5,000 ppm | 1, 2 |
| cyanates, iso and thio | 10 | 5,000 ppm | 1, 2 |
| dichloromethane (methylene chloride) | 10 | 5,000 ppm | 1, 2, 4 |
| ferrosilicon and alloys | 10 | 5,000 ppm | 1, 2 |
| fluorine (elemental) | 10 | 5,000 ppm | 1, 2 |
| halogen-silanes | 10 | 5,000 ppm | 1, 2 |
| halogenates that produce acidic vapor w/water | 10 | 5,000 ppm | 1, 2 |
| hydrazines | 10 | 5,000 ppm | 1, 2 |
| manganese-silicon | 10 | 5,000 ppm | 1, 2 |
| mercaptans | 10 | 5,000 ppm | 1, 2 |
| methyl ethyl ketone | 10 | 5,000 ppm | 1, 2, 4 |
| methyl isobutyl ketone | 10 | 5,000 ppm | 1, 2 ,4 |
| molybdenum compounds (molybdenum metal OK) | 10 | 5,000 ppm | 1, 2 |
| nickel compounds | 10 | 5,000 ppm | 1, 2 |
| nitriles | 10 | 5,000 ppm | 1, 2 |
| organic azo and azo-oxy compounds | 10 | 5,000 ppm | 1, 2 |
| organic halogen compounds (except where noted) | 10 | 5,000 ppm | 1, 2 |
| organic nitro and nitroso compounds | 10 | 5,000 ppm | 1, 2 |
| organic peroxides | 10 | 5,000 ppm | 1, 2 |
| organic phosphorous compounds | 10 | 5,000 ppm | 1, 2 |

TABLE 1-continued

| Substance | Toxicity Index | Published Limit | Ref* |
|---|---|---|---|
| phenol and phenolic compounds | 10 | 5,000 ppm | 1, 2 |
| silicon tetrachloride | 10 | 5,000 ppm | 1, 2 |
| silver compounds | 10 | 5,000 ppm | 1, 2 |
| tetrachloroethylene | 10 | 5,000 ppm | 1, 2, 4 |
| tin compounds (inorganic) | 10 | 5,000 ppm | 1, 2 |
| titanium tetrachloride | 10 | 5,000 ppm | 1, 2 |
| trichloroethylene (TCE) | 10 | 5,000 ppm | 1, 2, 4 |
| tungsten compounds (metallic tungsten OK) | 10 | 5,000 ppm | 1, 2 |
| vanadium compounds (metallic vanadium OK) | 10 | 5,000 ppm | 1, 2 |
| white phosphorus | 10 | 5,000 ppm | 1, 2 |
| acid amides | 2.5 | 20,000 ppm | 1, 2 |
| acid anhydrides | 2.5 | 20,000 ppm | 1, 2 |
| acid halides | 2.5 | 20,000 ppm | 1, 2 |
| ammonia and ammonium compounds | 2.5 | 20,000 ppm | 1, 2 |
| aromatic compounds (except where noted separately) | 2.5 | 20,000 ppm | 1, 2 |
| barium compounds, except barium sulfate | 2.5 | 20,000 ppm | 1, 2 |
| bromates, hypobromates | 2.5 | 20,000 ppm | 1, 2 |
| chlorates, hypochlorates | 2.5 | 20,000 ppm | 1, 2 |
| fluorine compounds | 2.5 | 20,000 ppm | 1, 2 |
| inorganic peroxides | 2.5 | 20,000 ppm | 1, 2 |
| iodates | 2.5 | 20,000 ppm | 1, 2 |
| nitrates, nitrites | 2.5 | 20,000 ppm | 1, 2 |
| organic silicon compounds | 2.5 | 20,000 ppm | 1, 2 |
| organic sulfur compounds | 2.5 | 20,000 ppm | 1, 2 |
| per-acid salts | 2.5 | 20,000 ppm | 1, 2 |
| phosphorous compounds (except Al, Ca, Fe phosphates-see white phosphorus) | 2.5 | 20,000 ppm | 1, 2 |
| sulfides | 2.5 | 20,000 ppm | 1, 2 |
| toluene | 2.5 | 20,000 ppm | 1, 2 |
| xylenes | 2.5 | 20,000 ppm | 1, 2, 4 |
| zinc compounds (metallic zinc OK) | 2.5 | 20,000 ppm | 1, 2 |
| aliphatic hydrocarbons | 1 | 50,000 ppm | 1, 2 |
| highly flammable substances | 1 | 50,000 ppm | 1, 2 |
| hydrides | 1 | 50,000 ppm | 1, 2 |
| inorganic acids | 1 | 50,000 ppm | 1, 2 |
| metal bisulphates | 1 | 50,000 ppm | 1, 2 |
| nitrides | 1 | 50,000 ppm | 1, 2 |
| organic nitrogen compounds | 1 | 50,000 ppm | 1, 2 |
| organic oxygen compounds | 1 | 50,000 ppm | 1, 2 |
| oxides and hydroxides, except for C, Si, Fe, Al, Ti, Mn, Mg, Ca | 1 | 50,000 ppm | 1, 2 |
| pyrophoric substances | 1 | 50,000 ppm | 1, 2 |
| sulfur (elemental) | 1 | 50,000 ppm | 1, 2 |

*References:
1) Dutch PTT Telecom SI-212219010 version 931229
2) Hazardous Waste Designation Decree 617 (The Netherlands, 1993)
3) Chem VerbotsV (Germany, 1994)
4) RCRA 33/50 (USA)

Since each component or piece part in an electronic device typically contains two or more substances or materials, and each of these materials have varying degrees of toxicity ranging from benign to hazardous, a measurement of the relative toxicity of the component is needed. The Component Toxicity Index of an individual component or piece-part is defined as the product of the Unit Toxicity value of each substance contained in the component and the total mass of the component:

Component Toxicity Index $A_n$=(Unit Toxicity$_{substance\ i}$+Unit Toxicity$_{substance\ j}$ ... ) * Mass of Component $A_n$.

This equation is significantly different from intuitive methods used in the prior art where the total amount (mass) of offending substances is calculated using the actual concentrations found in the component. In our Component Toxicity Index, even though a substance may be present in a particular component or part in an amount below its legislated level, the full Unit Toxicity value is used for two reasons:

i. It is usually not feasible for the designer to have access to the actual chemical concentrations of each of the hazardous substances present in the component. This information is often proprietary, or cannot be quickly measured.

ii: Regardless of the concentration (unless it is acknowledged to be a "trace" amount—see below) the designer should strive to identify less hazardous alternative materials. In practice, it is usually only the most highly restricted substances (Unit Toxicity value=1000) that become an issue here, and the designer should strive to eliminate dependence on these materials, thus minimizing future potential liability when these materials might be elevated from 'highly restricted' status to 'banned' status. Mercury, dioxin, polychlorinated biphenyls, polybrominated biphenyls, asbestos and chlorofluorocarbons are examples of historical cases in point.

The rationale for multiplying the Unit Toxicity value times the mass of the component is to provide the designer with the additional ability to minimize environmental impact by minimizing the total mass of the part. Although elimination of the controlled substance is the high goal, it is often not feasible. One case in point is the use of solder that contains tin and lead. Although substitutes exist for the conventional lead-containing solders, none are completely satisfactory, and most soldering operations still employ tin/lead solders. Since the lead in solder or solder paste cannot be feasibly eliminated, the designer will be rewarded with a lower Component Toxicity Index by reducing the amount of solder used in the product. Lighter products also reduce the environmental impact of distribution and shipping. Another benefit of factoring in the component mass is that it draws attention to large parts with hazardous material content. These large parts are often those that are difficult to recycle or de-manufacture.

Having calculated a toxicity level for the individual component, we can now make an assessment of the toxicity level of the entire communications device by calculating a Product Toxicity Index. The Product Toxicity Index is defined as the sum of all the individual Component Toxicity Index values:

Product Toxicity Index=(Component Toxicity Index $A_1$+Component Toxicity Index $A_2$+...+Component Toxicity Index $A_n$).

Figure 1:
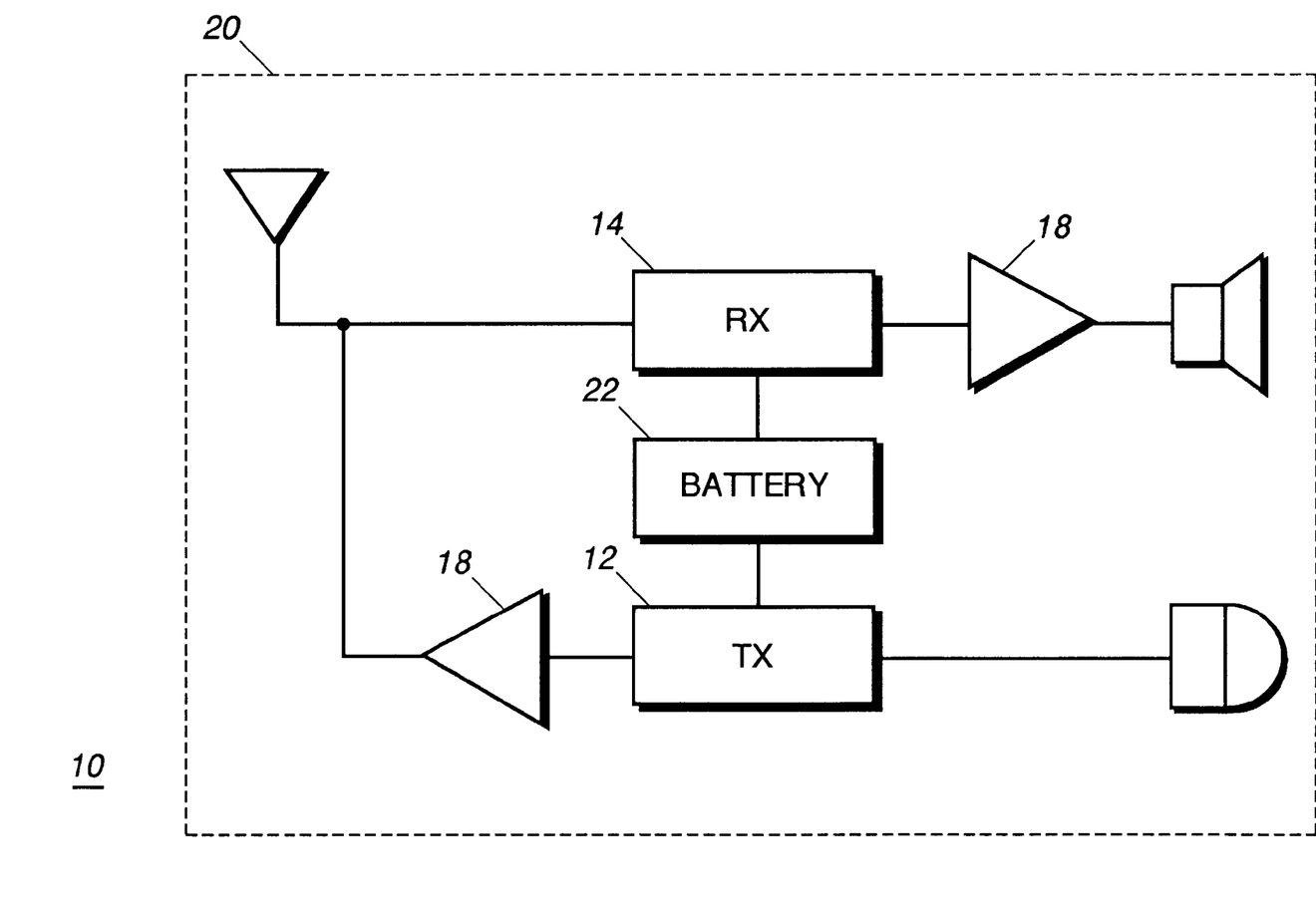
FIG. 1 is a schematic representation of a communication device in accordance with the invention.

Referring now to FIG. 1, in the case of a two-way portable radio 10, the Product Toxicity Index may be calculated by summing up the toxicity index for the radio transmitter 12, the radio receiver 14, the antenna 16, the amplifier 18, the housing 20 and the battery 22 (if applicable):

Product Toxicity Index=(radio transmitter Toxicity Index+radio receiver Toxicity Index+antenna Toxicity Index+amplifier Toxicity Index+battery Toxicity Index+housing Toxicity Index).

In some cases, the battery is not included in this calculation, as it might be a detachable part, and therefore analyzed as a separate device. Many prior art communication devices have been analyzed and their associated Product Toxicity Index calculated. In all cases, the Product Toxicity Index is in excess of 2000, and commonly 3000 or more. Product Toxicity Index values for some representative prior art communication devices are shown in Table 2.

TABLE 2

| Motorola two-way portable radio | 3634 |
| Ericsson PCS cellular telephone | >1600 |
| Motorola Pager | 318 |

A desirable goal for the designer would be to create a communications device that has Product Toxicity Index of less than 100. A level of 100 does not guarantee the absence of highly regulated substances in the product, but experience designing to the index has shown that hazardous substances have been eliminated or are only present in parts weighing <100 mg. Reducing the Product Toxicity Index even further to a level of 10 essentially guarantees that the communication device does not have any highly hazardous materials in significant quantities contained therein. While it is envisioned that a radio with a Product Toxicity Index of 100 is an improvement of more than 2 orders of magnitude over the prior art radios, it is not inconceivable that future legislation or consumer demand will require products with scores in the 10–70 range. The best achievable scores in products that still use lead-containing solder are around 200. A Product Toxicity Index goal of <100 would typically require further reduction of lead and elimination of antimony alloy interconnects. Some examples of designing to the index are now shown.

Plastics

All polymers by definition have a Unit Toxicity value of zero unless there are regulated additives or catalysts known to be present. Heavy metal pigments (e.g. cadmium, chromium, antimony, selenium, and nickel based colorants) and flame retardant systems (e.g. antimony, polybrominated biphenyl (PBB), etc.) are the most commonly regulated additives that may be present in plastics. Although the monomers themselves may be regulated (e.g. styrene, vinyl chloride, cyanate esters) it is assumed that residual monomer content in the reacted polymer is negligible. Antimony oxide is used as a catalyst in the synthesis of polyethylene terephthalate. One commonly used plastic in communication devices is Mylar® polyester from the DuPont Company. Residual antimony is present in Mylar® typically between 100–300 ppm. Other catalysts such as germanium oxide can be used for making polyester, although antimony oxide is the industry standard. We have not been able to acquire antimony-free Mylar, so alternative materials such as polyimide, polyethylene, or polymethyl methacrylate films are suggested where applicable. Polyvinyl chloride (PVC) is another material found in communication devices, commonly used as wire insulation, and may contain up to 80% w/w of an aromatic ester plasticizer such as dioctyl phthalate (Unit Toxicity value=2.5)

Lead

Although lead and lead compounds are strictly legislated to 5000 ppm (Unit Toxicity value=10) stricter limits have been imposed by the European toy industry. To address increasing concerns regarding lead toxicity, our Unit Toxicity value for lead compounds (e.g. lead sulfide, plastic pigments and PVC stabilizers) has been set at 1000 and the index for metallic lead/lead alloy applications has been set at 100.

Beryllium

Although the use of beryllium compounds, such as beryllium oxide used in heat transfer paste applications, is highly restricted, legislation does not presently restrict the use of metallic beryllium in alloy applications. Beryllium and beryllium compounds are legislated to 50 ppm (Unit Toxicity value=1000). However, an exemption is provided for the use of beryllium as part of a "non-corrodable" alloy (such as beryllium/copper) if it is present in concentrations that do not exceed 20%. Our Toxicity Index scoring method does not permit the 20% alloy exemption (see below), however the Unit Toxicity value for metallic beryllium has been relaxed to a value of 100, whereas beryllium compounds are still assigned a Unit Toxicity value of 1000 in accordance with the spirit of legislated directives.

"Trace Level" Exemptions

The Product Toxicity Index has been designed to highlight the use of regulated substances and to provide incentives for eliminating the use of those that are highly restricted. As indicated above, even though a substance may be present below its legislated level within a particular part or assembly, it is assigned the full Unit Toxicity value because it is usually not feasible for the designer to have access to the actual concentrations. In the event that concentration information is available, a threshold is set at 50 parts-per-million (0.005%) below which the level is acknowledged to be a "trace" amount and therefore exempt from assignment of a Unit Toxicity value. Since metallic impurities are difficult to overcome in alloy systems a threshold limit of 250 ppm (0.025%) has been set for metal alloys, similar to the mercury level limitations that have been developed for electrode applications by the battery industry. Metallic impurities present in metal parts or alloy materials lower than the 250 ppm threshold limit are acknowledged to be a "trace" amount and therefore exempt from assignment of a Unit Toxicity value. Note that the beryllium content in typical beryllium/copper alloys approaches 5% (50,000 ppm). Beryllium/copper parts are therefore subject to the Unit Toxicity value for beryllium metal.

Banned Substances

In order to dissuade the use of certain banned substances (e.g. cadmium plating, halogenated dioxins, etc.) the letter "X" is factored into the Toxicity index equation as a unit toxicity weighting factor. Any component or assembly toxicity index score containing the term "X" is by definition unacceptable.

Examples of communication devices, and the corresponding Product Toxicity index scores, are now presented, to show prior art devices in comparison to devices designed to reduce the level of toxic materials.

EXAMPLE 1

Prior art Motorola two-way radio

| DESCRIPTION | MATERIALS | WEIGHT (GRAMS) | TOXICITY INDEX | COMPONENT TOXICITY |
|---|---|---|---|---|
| Speaker/mic | Nomex ® (Du Pont) copper alloy | 0.6 | 0 | 0 |
| Microphone | | 0.2 | 0 | 0 |
| Keypad | Silicon Rubber | 2 | 0 | 0 |
| Clip Locks | 410 Stainless Steel | 2 | 0 | 0 |
| Power amplifier clip | Copper | 19 | 0 | 0 |
| Contacts | Nickel Silver alloy | 0.2 | 0 | 0 |
| Frequency Knob | thermoplastic polyurethane | 1.4 | 0 | 0 |
| Chassis | Zinc alloy | 80.2 | 0 | 0 |
| Front Shield | Nickel Silver | 26.8 | 0 | 0 |
| Housing | Polycarbonate blend | 49 | 0 | 0 |
| O-Ring | Silicon Rubber | 1.2 | 0 | 0 |
| Volume Knob | Thermoplastic urethane | 1 | 0 | 0 |
| Speaker Pads | Poron ® urethane | 0.1 | 0 | 0 |
| | Mylar ® | 0.1 | 1000 | 100 |
| Dust Cap | Thermoplastic Polyurethane | 0.6 | 0 | 0 |
| Bezel | Polycarbonate | 1.6 | 0 | 0 |
| Battery Latch | Stainless Steel | 5.8 | 0 | 0 |
| Battery latch spring | Stainless steel | 0.01 | 0 | 0 |
| Rubber Light Pipe | Silicon Rubber | 2.6 | 0 | 0 |
| Escutcheon | Polycarbonate-acrylic adhesive | 0.3 | 0 | 0 |
| Foam Pads | Open celled Polyurethane Foam | 0.4 | 0 | 0 |
| Light Pipe | Polycarbonate | 0.4 | 0 | 0 |
| Mic Boot | Silicon Rubber | 0.8 | 0 | 0 |
| Speaker | Steel | 11.6 | 0 | 0 |
| Escutcheon | Polycarbonate-acrylic adhesive | 0.05 | 0 | 0 |
| Speaker Felt | Felt cloth | 0.2 | 0 | 0 |
| Speaker shield | Tin plated copper | 0.2 | 0 | 0 |
| Mylar film | Mylar ® | 1 | 1000 | 1000 |
| Seals | Silicon Rubber | 0.8 | 0 | 0 |
| Receiver PC board | FR4 Printed circuit board | 1.6 | 2.5 | 4 |
| | tin-lead solder | 0.08 | 1100 | 88 |
| Power supply PC board | FR4 Printed circuit board | 1 | 2.5 | 2.5 |
| | tin-lead solder | 0.09 | 1100 | 98 |
| Controller PC board | FR4 Printed circuit board | 23.4 | 2.5 | 58.5 |
| | tin-lead solder | 2.12 | 1100 | 2332 |
| Total | | 238.45 | | 3684 |

EXAMPLE 2

Improved Motorola two-way radio, designed to reduce the toxicity index.

| COMPONENT | MATERIAL | WEIGHT (GRAMS) | TOXICITY INDEX | COMPONENT TOXICITY |
|---|---|---|---|---|
| BEZEL | Polycarbonate | 10.54 | 0 | 0 |
| BELT CLIP | Polycarbonate | 2.87 | 0 | 0 |
| FRONT HOUSING | Polycarbonate | 23.78 | 0 | 0 |
| SPEAKER | Steel | 9.88 | 0 | 0 |
| MICROPHONE SEAL | Poron ® | 0.005 | 0 | 0 |
| SWITCH SEAL | Poron ® | 0.06 | 0 | 0 |
| SPEAKER PAD | Poron ® | 0.08 | 0 | 0 |
| ANTENNA CLIP 1 | Nickel plated steel | 0.18 | 0 | 0 |
| GAUZE | Polyester | 0.16 | 0 | 0 |
| LIGHT GUIDE | Acrylic | 0.07 | 0 | 0 |
| SPEAKER SEAL | Poron ® | 0.11 | 0 | 0 |
| BEZEL SEAL | Polycarbonate | | 0 | 0 |
| REAR HOUSING | Polycarbonate | 22.6 | 0 | 0 |
| POWER CONTACT | Nickel plated steel | 0.4 | 0 | 0 |
| LINK CONTACT | Nickel plated steel | 1.05 | 0 | 0 |
| SPEAKER PAD | Poron ® | 0.08 | 0 | 0 |
| BATTERY PAD | Poron ® | 0.66 | 0 | 0 |
| BATTERY COVER | Polycarbonate | 15.6 | 0 | 0 |
| GAITOR | Hytrel ® | 8.4 | 0 | 0 |
| KNOB | Hytrel ® | 1.06 | 0 | 0 |
| PRINTED CIRCUIT BOARD | FR4 (glass-epoxy) | 22 | 2.5 | 55 |
| | Tin-lead solder paste | 1.99 | 1100 | 2189 |
| DAMPING PAD 1 | Poron ® | 0.01 | 0 | 0 |
| ANTENNA CLIP 2 | Nickel Silver | 0.18 | 0 | 0 |
| DAMPING PAD 2 | Poron ® | 0.08 | 0 | 0 |
| ANTENNA NUT | Nickel plated steel | 2.15 | 0 | 0 |
| HEAT SINK | Copper | 5.67 | 0 | 0 |
| SHIELD 1 | Tin plated steel | 0.57 | 0 | 0 |
| SHIELD 2 | Tin plated steel | 1.58 | 0 | 0 |
| SHIELD 3 | Tin plated steel | 0.6 | 0 | 0 |
| SHIELD 4 | Tin plated steel | 5.4 | 0 | 0 |
| SHIELD 5 | Tin plated steel | 3.6 | 0 | 0 |
| SHIELD 6 | Tin plated steel | 0.48 | 0 | 0 |
| Total | | 121.845 | 1102.5 | 2244 |

EXAMPLE 3

Prior art Motorola Pager

| DESCRIPTION | MATERIAL | WEIGHT (GRAMS) | TOXICITY INDEX | COMPONENT TOXICITY |
|---|---|---|---|---|
| Housing, front | Polycarbonate | 10.44 | 0 | 0.00 |
| Grill cloth | Nylon | | 0 | 0.00 |
| Housing, back | Polycarbonate | 5.68 | 0 | 0.00 |
| Battery door latch | polyoxymethylene (Acetal) | 0.08 | 0 | 0.00 |
| Battery door | Polycarbonate | 2.37 | 0 | 0.00 |
| Keypad | Silicon Rubber | 2.23 | 0 | 0.00 |
| Transducer | Glass-filled Nylon | | | 0 |
| Vibrator motor | Steel, gold, tungsten alloy | 2.37 | 0 | 0.00 |
| | Nickel plating | 0.039 | 10 | 0.39 |
| Bracket, motor | Stainless Steel | | 0 | 0.00 |
| Contact, positive | Beryllium/copper alloy | 0.15 | 1000 | 150.00 |
| Contact, negative | Stainless Steel, nickel plating | 0.03905 | 10 | 0.39 |
| Shield | Nickel Silver | | | 1.29 |
| Header | Glass filled polyester | 0.1809 | 0 | 0.00 |
| | Phosphor bronze | 0.10712 | 0 | 0.00 |
| | Nickel plating | 0.0037796 | 10 | 0.04 |
| Incandescent Lamp | | 68 | 0 | 0.00 |

| DESCRIPTION | MATERIAL | WEIGHT (GRAMS) | TOXICITY INDEX | COMPONENT TOXICITY |
|---|---|---|---|---|
| Decoder PCB | FR-4 printed circuit board | 2.4224 | 2.5 | 6.06 |
| | Tin-Lead solder | 0.24185 | 100 | 24.19 |
| Receiver PCB | FR-4 printed circuit board | 2.41378 | 2.5 | 6.03 |
| | Tin-Lead solder | 0.1414525 | 100 | 14.15 |
| Boot | Silicon Rubber | | 0 | 0.00 |
| Connector | Beryllium/copper alloy | 0.054926828 | 1000 | 54.93 |
| | Polyphenylene Sulfide | 0.224 | 2.5 | 0.56 |
| Antenna | Silver plated copper | 1.35 | 0 | 0.00 |
| Light Wedge | Polycarbonate | | 0 | 0.00 |
| Tape, reflective | Mylar ® (polyester) | 0.06 | 1000 | 60.00 |
| LCD | | 2.4 | 0 | 0.00 |
| Lens-LCD | Polymethyl methacrylate | 0 | 0.00 | |
| Pad, Antenna | Butyl-white | 1.48 | 0 | 0.00 |
| Screw | Stainless Steel | | 0 | 0.00 |
| Label | Polycarbonate | | 0 | 0.00 |
| Belt clip | Polycarbonate | | 0 | 0.00 |
| Leaf spring | Stainless Steel | | 0 | 0.00 |
| Pin, Belt clip | Stainless Steel | | 0 | 0.00 |
| | TOTAL | 34.48 | | 318.02 |

EXAMPLE 4

A two-way radio designed to have a Product Toxicity Index less than 100.

| COMPONENT | MATERIAL | WEIGHT (GRAMS) | TOXICITY INDEX | COMPONENT TOXICITY |
|---|---|---|---|---|
| BEZEL | Polycarbonate | 10.54 | 0 | 0 |
| BELT CLIP | Polycarbonate | 2.87 | 0 | 0 |
| FRONT HOUSING | Polycarbonate | 23.78 | 0 | 0 |
| SPEAKER | Steel | 9.88 | 0 | 0 |
| MICROPHONE SEAL | Poron ® | 0.005 | 0 | 0 |
| SWITCH SEAL | Poron ® | 0.06 | 0 | 0 |
| SPEAKER PAD | Poron ® | 0.08 | 0 | 0 |
| ANTENNA CLIP 1 | Nickel plated steel | 0.18 | 0 | 0 |
| GAUZE | Polyester | 0.16 | 0 | 0 |
| LIGHT GUIDE | Acrylic | 0.07 | 0 | 0 |
| SPEAKER SEAL | Polycarbonate | 0.11 | 0 | 0 |
| BEZEL SEAL | Adhesive SP4044 | | 0 | 0 |
| REAR HOUSING | Polycarbonate | 22.6 | 0 | 0 |
| POWER CONTACT | Nickel plated steel | 0.4 | 0 | 0 |
| LINK CONTACT | Nickel plated steel | 1.05 | 0 | 0 |
| SPEAKER PAD | Poron ® | 0.08 | 0 | 0 |
| BATTERY PAD | Poron ® | 0.66 | 0 | 0 |
| BATTERY COVER | Polycarbonate | 15.6 | 0 | 0 |
| GAITOR | Hytrel ® | 8.4 | 0 | 0 |
| KNOB | Hytrel ® | 1.06 | 0 | 0 |
| PRINTED CIRCUIT BOARD | FR4 (glass-epoxy) | 22 | 2.5 | 55 |
| | Indium-tin solder paste | 1.99 | 0 | 0 |
| DAMPING PAD 1 | Poron ® | 0.01 | 0 | 0 |
| ANTENNA CLIP 2 | Nickel Silver | 0.18 | 0 | 0 |
| DAMPING PAD 2 | Poron ® | 0.08 | 0 | 0 |
| ANTENNA NUT | Nickel plated steel | 2.15 | 0 | 0 |
| HEAT SINK | Copper | 5.67 | 0 | 0 |
| SHIELD 1 | Tin plated steel | 0.57 | 0 | 0 |
| SHIELD 2 | Tin plated steel | 1.58 | 0 | 0 |
| SHIELD 3 | Tin plated steel | 0.6 | 0 | 0 |
| SHIELD 4 | Tin plated steel | 5.4 | 0 | 0 |
| SHIELD 5 | Tin plated steel | 3.6 | 0 | 0 |
| SHIELD 6 | Tin plated steel | 0.48 | 0 | 0 |
| | Total | 121.845 | 2.5 | 55 |

EXAMPLE 5

A prior art Ericsson two-way radio

| DESCRIPTION | MATERIAL | WEIGHT (GRAMS) | TOXICITY INDEX | COMPONENT TOXICITY |
|---|---|---|---|---|
| FRONT CAP | PLASTIC PART | 18.2600 | 0.0 | 0 |
| P901 CONNECTOR HOLDER | PLASTIC PART | 0.8760 | 0.0 | 0 |
| P901 CONNECTOR "MOE" | FLEX | 0.1500 | 10.0 | 2 |
| AUDIO/LOGIC BOARD | PCB ASSEMBLY | 33.1158 | 2.5 | 83 |
|  | Sn/Pb SOLDER (ESTIMATE) | 3.3000 | 100.0 | 330 |
| MACHINE SCREW 1 | HARDWARE | 0.7329 | 0.0 | 0 |
| MACHINE SCREW 2 | HARDWARE | 0.4889 | 0.0 | 0 |
| RFSHIELD | SHEETMETAL | 30.2975 | 0.0 | 0 |
| POWER MODULE MOUNTING CLIP | SHEETMETAL | 1.0000 | 0.0 | 0 |
| TRANSMIT/RECEIVE BOARD | PCB ASSEMBLY | 72.6022 | 2.5 | 182 |
|  | Sn/Pb SOLDER (ESTIMATE) | 7.2000 | 100.0 | 720 |
| REAR COVER | CASTING | 112.5676 | 0.0 | 0 |
| MACHINE SCREW | HARDWARE | 0.7965 | 0.0 | 0 |
| BNC ANTENNA CONNECTOR | CONNECTOR | 4.4705 | 0.0 | 0 |
| SETSCREW | HARDWARE | 0.0645 | 0.0 | 0 |
| MACHINE SCREW | HARDWARE | 0.7965 | 0.0 | 0 |
| ANTENNA, HELICAL | ANTENNA | 43.2010 | 0.0 | 0 |
| KEYPAD | RUBBER PART | 4.5000 | 0.0 | 0 |
| KEYPAD BOARD | PCB | 4.7000 | 2.5 | 12 |
|  | Sn/Pb SOLDER (ESTIMATE) | 0.5000 | 100.0 | 50 |
| FLEX | FLEX | 3.0000 | 0.0 | 0 |
|  | Sn/Pb SOLDER (ESTIMATE) | 0.3000 | 100.0 | 30 |
| LENS SEAL | RUBBER PART | 0.3000 | 0.0 | 0 |
| INSERTS | HARDWARE | 1.0000 | 0.0 | 0 |
| SPEAKER | SPEAKER | 15.0000 | 0.0 | 0 |
| MOLDED PC BOARD | MOLDED PCB | 14.0000 | 0.0 | 0 |
|  | Sn/Pb SOLDER (ESTIMATE) | 1.4000 | 100.0 | 140 |
| MICROPHONE | MICROPHONE | 0.2444 | 0.0 | 0 |
| WIRES | WIRE | 1.0000 | 0.0 | 0 |
| LCD | LCD | 3.1500 | 0.0 | 0 |
| PTT BUTTON | RUBBER PART | 3.8225 | 0.0 | 0 |
| CONNECTORS | RUBBER PART | 0.3144 | 0.0 | 0 |
| DRIVER BOARD | PCB ASSEMBLY | 3.5055 | 2.5 | 9 |
|  | Sn/Pb SOLDER (ESTIMATE) | 0.3500 | 100.0 | 35 |
| DIFFUSER | PLASTIC PART | 2.0968 | 0.0 | 0 |
| LENS | LENS | 1.3400 | 0.0 | 0 |
| UCD BOOT | RUBBER PART | 0.7540 | 0.0 | 0 |
| UCD INSULATION | PAPER | 0.0118 | 0.0 | 0 |
| UCD COVER | PLASTIC PART | 2.6646 | 0.0 | 0 |
| UCD COVER SCREW | HARDWARE | 0.7965 | 0.0 | 0 |
| 9A PLASTIC PLUG | PLASTIC PART | 3.4220 | 0.0 | 0 |
| 9B METAL PIECE | SHEETMETAL | 2.3388 | 0.0 | 0 |
| 9C PLASTIC PIECE | PLASTIC PART | 0.6933 | 0.0 | 0 |
|  | TOTAL | 354.96 |  | 1591 |

The values used in the analysis of Example 5 are estimates in many cases, and the exact chemical composition of many of the components is unknown to the authors at this time. It is our experience that when chemical analysis of each component is performed, materials listed in Table 1 are typically found. This previously unknown information typically raises the Product Toxicity score substantially, so it is anticipated that the "true" score of the radio of Example 5 is more likely to be greater than 3000.

In summary, a communication device, such as a two-way radio or pager, has been designed to contain a very low level of toxic materials by assigning Unit Toxicity Values to various hazardous substances and then calculating a Product Toxicity Index. Products that have a Product Toxicity Index less than 100 can be more safely disposed of, will reduce stress on the environment, and can be more safely recycled. The resulting communication device is referred to as "environmentally friendly". While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, additional substances that are regulated may be added to the list as new legislation is enacted, or one may choose to use a different weighting scheme to design the communication device. However, no matter which measuring tool is employed to design the product, communication devices having low Product Toxicity Index scores are considered to fall under the spirit and scope of the present invention.

What is claimed is:

1. A communication device having a reduced level of hazardous substances, comprising:

a radio having a plurality of components $A_1, A_2, \ldots, A_n$, each component having a Component Toxicity Index calculated by the equation Component Toxicity Index $A_n$=(Unit Toxicity$_{substance\ i}$+Unit Toxicity$_{substance\ j}\ldots$) * Mass of Component $A_n$;

the communication device having a Product Toxicity Index of less than 100, where the Product Toxicity Index is calculated according to the equation Product Toxicity Index=(Component Toxicity Index $A_1$+Component Toxicity Index $A_2$+ . . . +Component Toxicity Index $A_n$); and wherein the Product Toxicity Index consists of the Component Toxicity Index of all components present in the radio.

2. A communication device having a reduced level of hazardous substances, comprising:

a radio having a plurality of components $A_1, A_2, \ldots, A_n$, each component having a Component Toxicity Index calculated by the equation;

Component Toxicity Index $A_n$=(Unit Toxicity$_{substance\ i}$+Unit Toxicity$_{substance\ j}\ldots$) * Mass of Component $A_n$;

wherein the Unit Toxicity of each substance is derived from a toxicity table containing a listing of a plurality of substances that are potentially hazardous, each substance with an accompanying numerical toxicity rating where a higher numerical toxicity rating indicates a higher degree of toxicity;

the communication device having a Product Toxicity Index of less than 100, where the Product Toxicity Index is calculated according to the equation Product Toxicity Index=(Component Toxicity Index $A_1$+Component Toxicity Index $A_2$+ . . . +Component Toxicity Index $A_n$); and wherein the Product Toxicity Index consists of the Component Toxicity Index of all components present in the radio.

3. The communication device according to claim 2, wherein the toxicity table further comprises an accompanying numerical maximum tolerance level value for each substance and units of measure therefor.

4. The communication device according to claim 2, wherein cadmium plating, mercury, halogenated dioxins and chlorofluorocarbons are banned substances assigned a Unit Toxicity of "X".

5. The communication device according to claim 4, wherein a Product Toxicity Index having an embedded "X" is categorized as "unacceptable".

* * * * *